A. ROSENTHAL.
HUSKING AND SHREDDING MACHINE.
APPLICATION FILED AUG. 10, 1906.
947,562.
Patented Jan. 25, 1910.
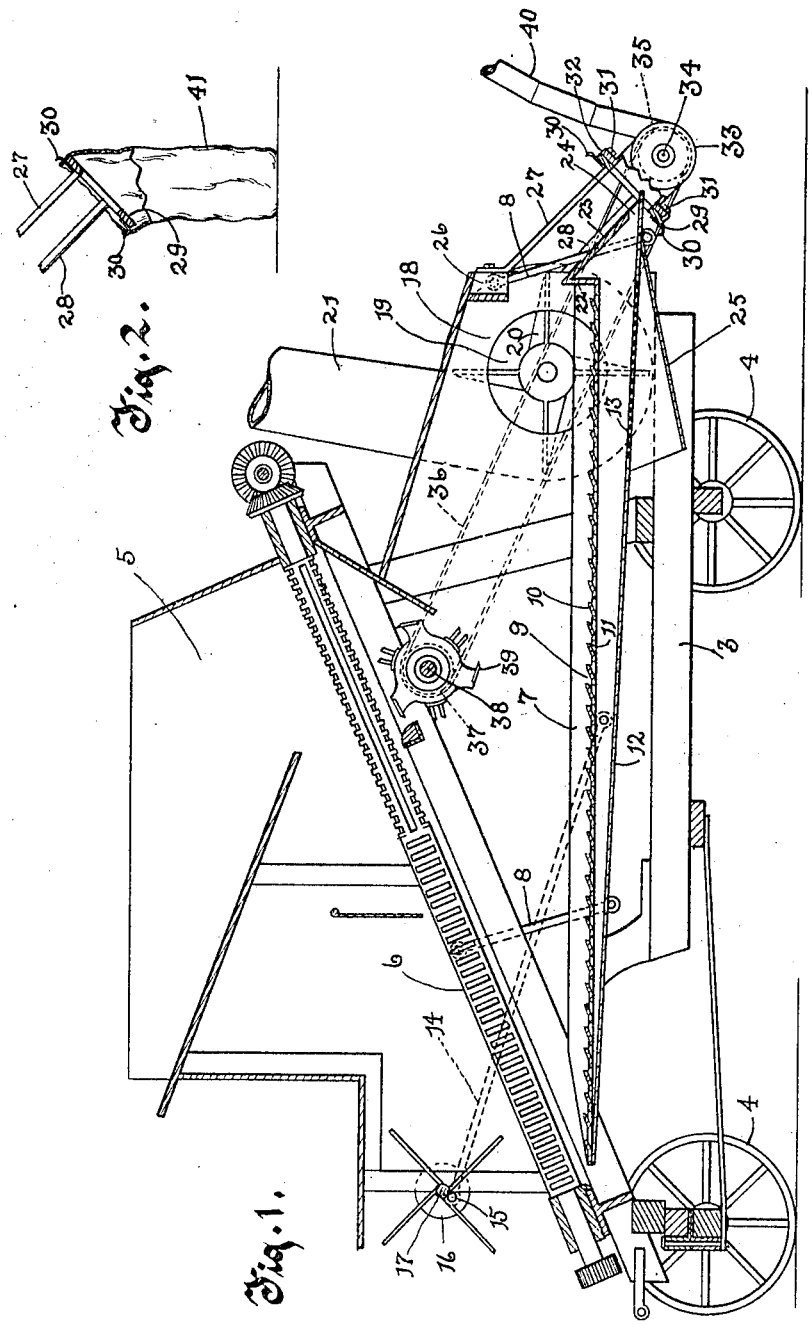
Witnesses.
Anna F. Schmidtbauer
Alma A. Klug
Inventor.
August Rosenthal
By Benedict, Morsell & Caldwell
Attorneys.

UNITED STATES PATENT OFFICE.

AUGUST ROSENTHAL, OF WEST ALLIS, WISCONSIN, ASSIGNOR TO ROSENTHAL MANUFACTURING COMPANY, OF WEST ALLIS, WISCONSIN, A CORPORATION OF WISCONSIN.

HUSKING AND SHREDDING MACHINE.

947,562.  Specification of Letters Patent.  Patented Jan. 25, 1910.

Application filed August 10, 1906. Serial No. 330,051.

*To all whom it may concern:*

Be it known that I, AUGUST ROSENTHAL, residing in West Allis, in the county of Milwaukee and State of Wisconsin, have invented new and useful Improvements in Husking and Shredding Machines, of which the following is a description, reference being had to the accompanying drawings, which are a part of this specification.

My invention has relation to improvements in husking and shredding machines, and relates more especially to means for either bagging the shelled corn, or else forcing said shelled corn to a place of final deposit, as well as to means for separating from the shelled corn dirt, or other foreign matter, previous to the bagging or delivering of the corn, the construction comprehending certain improvements upon the form of device covered in my issued Letters Patent No. 738,488, dated September 8, 1903.

The object of the present invention is to provide simple mechanism for accomplishing the above mentioned functions, and with this object in view, the invention consists of the devices and parts, or the equivalents thereof, as hereinafter more fully set forth.

In the accompanying drawings, Figure 1 is a side elevation in longitudinal section, of a corn-husking and shredding machine, showing my improvements applied thereto; and Fig. 2 is a fragmentary detail view of the means for securing the bag into which the shelled corn is adapted to be discharged.

Referring to the drawings, the numeral 3 indicates the truck of the machine which is preferably mounted on wheels 4, so that the machine may be readily run from one place to another. Mounted on the truck is a box-like frame or structure 5, of any desired construction best adapted for supporting the operating mechanism and for inclosing parts of the same. The usual inclined rotatable husking rolls 6 employed in this class of machines are located in the upper portion of the frame, as clearly shown in Fig. 1.

Referring to the improvements, the numeral 7 indicates a shaking double bottom trough, which is located in the lower portion of the frame below the husking rolls. This trough is swingingly hung on links 8 pivoted at their lower ends to opposite side pieces of the trough, and at their upper ends to the fixed frame work. The upper bottom piece 9 of the trough is formed with a series of inclined projections or ribs 10, and with a series of openings 11. The lower bottom piece 12 is imperforate throughout the greater portion of its length, but toward its forward end is reticulated, as indicated by the numeral 13. The openings, however, do not extend to the extreme forward edge of the bottom piece 12, as will be evidenced by Fig. 1. It will also be noticed that the lower bottom piece is on a downward slant toward the forward end of the machine. The shaking or agitating motion is imparted to the trough by means of a pitman 14 connected at one end to the trough, and at its opposite end to a wrist pin 15 projecting from a rotatable wheel 16 mounted on a shaft 17 at the rear end of the machine, said shaft adapted to be rotated in any desirable manner, as from any suitable rotatable part of the mechanism.

Near the forward end of the machine is a fan casing 18 having at one side an opening 19. Within this casing is a fan 20 adapted to be rotated by any desirable means, and leading from the casing is a discharge spout 21 into which the cut and shredded material is forced by the action of the fan, and blown therethrough to a place of deposit.

The upper bottom piece 9 of the trough extends along that side of the fan casing 18 in which the opening 19 is located, and terminates in an upwardly extending shoulder 22. A downwardly inclined extension 23 projects from the upper edge of this shoulder, and the lower edge of said extension terminates just above the lower bottom piece 12 of the trough, leaving an opening 24. The said extension, in connection with the imperforate forward portion of the lower bottom piece 12, forms a spout. Another spout 25 is disposed beneath and secured to the under side of the lower bottom piece 12 at a point of the lower bottom piece corresponding in location to the location of the reticulated or perforated portion of said bottom piece.

Secured at its upper end to a block 26 at the forward end of the frame, and extending forwardly at a downward slant, is an arm 27. Two other arms, designated by the numeral 28, are secured at their upper ends to the frame work of the machine, and extend forwardly at a downward slant. The forward ends of these several arms 27 and 28 are secured to a ring or annulus 29 arranged at an opposite slant to the slant of said arms, and provided with upper and lower hooks 30, 30. Removably attached to ring or annulus 29 by means of bolts 31 is another ring or annulus 32, and this latter ring or annulus is provided with a forwardly extending fan casing 33, in which is located a fan (not shown) mounted on a transverse rotatable shaft 34. This shaft may be rotated in any desirable manner, and I show in the drawings a pulley wheel 35 on the shaft having a belt 36 passing therearound, said belt also passing around and being driven by another pulley wheel 37 on the rotatable shaft 38 upon which the cutting and shredding mechanism 39 is mounted. From the fan casing 33 extends a flexible and reversible spout or conduit 40 which is of sufficient length to discharge into a wagon box, or into any other place located at a distance vertically.

One of the important features of my invention is the adaptability of the construction to discharge shelled corn into a bag 41, as indicated in Fig. 2, or into the fan casing 33 and thence upwardly through the spout or conduit 40 of said casing, as indicated in Fig. 1. When it is desired that the shelled corn shall be discharged through the spout 40, the arrangement is such as is shown in Fig. 1, i. e., the outer ring or annulus 32 being secured by means of the bolts 31 to the inner ring or annulus 29. If, however, it is not desired to use the conduit 40, and it is preferred to discharge the shelled corn directly into a bag, all that is necessary to be done is to remove the bolts 31, when of course the ring 32 may be readily separated from the ring 29. The bag 41 is then attached by means of the hooks 30, 30 to ring 29, as clearly shown in Fig. 2.

In the operation of the invention, the husks and corn stalks pass between the husking rolls, as usual in this class of devices, while the husked ears of corn slide down the rolls into a suitable receptacle. The corn stalks and husks which pass between the rolls are acted upon by the cutting and shredding mechanism 39, and after being cut and broken drop on to the upper bottom piece 9 of the shaking trough. By reason of the fact that the trough is subjected to a continual shaking motion or agitation, the cut and shredded stalks owing to the peculiar formation of the projections 10 are forced forwardly, and when they reach a point of the bottom piece 9 in line with the opening 19 of the fan casing 18, they are sucked through said opening into the fan casing, where they are forced by the action of the fan through the discharge spout 27 to the place of deposit. Any dross or dirt which may pass downwardly with the cut corn stalks and fall on to the upper bottom piece 9 is, through the shaking motion of the trough, caused to pass through the openings 11 in said bottom piece and fall on to the lower bottom piece 12. As this lower bottom piece is on a decline toward the forward end of the machine this dirt slides down the incline of said bottom piece, assisted by the shaking movement imparted to the trough, and passes through the perforated portion 13 of said bottom piece and into the trough 25, being discharged from said trough on to the ground. In this way, dirt, or other foreign matter, is to a large extent prevented from being carried into the fan casing with the cut and shredded corn stalks and husks, or carried with the shelled corn to the point of discharge of said corn. If, in the operation of husking, any corn should be shelled from the ears and pass between the husking rolls, said shelled corn will fall on to the upper bottom piece 9, thence pass through the openings 11 thereof and on to the lower bottom piece 12, and by the shaking movement, caused to slide down said bottom piece to the forward end of the machine. The perforations 13 at the forward end of the machine are too small to permit these kernels of corn to pass therethrough, and consequently said kernels are discharged through the opening 24 of the forward spout into either the fan casing 33 or into the bag 41 in accordance with which of these two devices are adjusted to the machine. As the kernels of corn reach the perforations 13, the action of the fan 20 causes foreign matter which may be mixed with the shelled corn and is too large to drop through the openings 13 to be drawn through the opening 19 and forced up the conduit 21.

The shoulder 22 at the forward end of the upper bottom piece 9 acts as a guard to prevent the cut and shredded material from passing out of the front end of the machine, and thereby affords the fan 20 full opportunity to suck or draw said shredded material into the fan casing 18. The inclined extension 23 serves the function of a deflector, compelling the shelled corn to be crowded against the bottom piece 12 and consequently causing said shelled corn to pass directly out of the opening 24.

What I claim as my invention is:

1. In a corn-husking and shredding machine, the combination of corn discharging means, a bag attaching frame at the discharge opening of said means, a fan casing provided with a discharge spout, and means for detachably connecting said fan casing to the bag attaching frame.

2. In a corn-husking and shredding machine, the combination of corn discharging means, a frame extending forwardly from the forward end of the machine, a ring or annulus at the forward end of said frame and provided with bag-holding means and in line with the discharge openings of the corn discharging means, another ring or annulus having a fan casing projecting forwardly therefrom, said fan casing provided with a discharge spout, and means for removably connecting the latter ring or annulus to the first referred to ring or annulus.

3. In a corn-husking and shredding machine, the combination of corn-discharging means, a frame extending forwardly from the forward end of the machine, this frame being open on all sides to admit air, a ring at the forward end of the frame, this ring being located so as to surround the discharge opening of the corn-discharging means, another ring having a fan-casing projecting forwardly therefrom and provided with a discharge spout, a suction fan in said casing, and means for detachably connecting said two rings together.

In testimony whereof, I affix my signature, in presence of two witnesses.

AUGUST ROSENTHAL.

Witnesses:
  A. L. MORSELL,
  ANNA F. SCHMIDTBAUER.